(12) United States Patent
Samuthirapandian et al.

(10) Patent No.: US 9,747,807 B2
(45) Date of Patent: Aug. 29, 2017

(54) SYSTEMS AND METHODS FOR DISPLAYING QUICK PREVIEW NOTICES TO AIRMEN

(71) Applicant: HONEYWELL INTERNATIONAL INC., Morristown, NJ (US)

(72) Inventors: Subash Samuthirapandian, Tamilnadu (IN); Markus Alan Johnson, Blue River, OR (US); Pramod Kumar Malviya, Karnataka (IN); Jayasenthilnathan B, Karnataka (IN); Bretislav Passinger, Prerov (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/606,337

(22) Filed: Jan. 27, 2015

(65) Prior Publication Data

US 2016/0217693 A1    Jul. 28, 2016

(51) Int. Cl.
*G06F 19/00* (2011.01)
*G06G 7/70* (2006.01)
(Continued)

(52) U.S. Cl.
CPC ............ *G08G 5/0021* (2013.01); *G01C 23/00* (2013.01); *G08G 5/003* (2013.01); *G08G 5/0013* (2013.01); *G08G 5/0039* (2013.01); *G08G 5/06* (2013.01)

(58) Field of Classification Search
CPC .. G08G 5/0013; G08G 5/0017; G08G 5/0021; G08G 5/0039; G01C 21/00; G01C 23/00
(Continued)

(56) References Cited

U.S. PATENT DOCUMENTS

| 8,024,078 B2 | 9/2011 | Coulmeau et al. |
| 8,200,378 B1 | 6/2012 | Chiew et al. |

(Continued)

FOREIGN PATENT DOCUMENTS

| EP | 2381433 A1 | 10/2011 |
| EP | 2574965 A2 | 4/2013 |
| EP | 2581893 A2 | 4/2013 |

OTHER PUBLICATIONS

A NOTAM briefing in Easy VFR; Pocket FMS. Empowering pilots since 2003; 2009.

(Continued)

*Primary Examiner* — Isaac Smith
(74) *Attorney, Agent, or Firm* — Lorenz & Kopf, LLP

(57) ABSTRACT

A flight display system or method in accordance with this disclosure involves the presentation, on an aircraft, of a "quick preview" notice to airmen ("NOTAM") display that includes a plurality of stacked flight route portion boxes, each of the plurality of flight route portion boxes pertaining to and being labeled as one of: a departure taxiing portion, a standard instrument departure portion, an en route portion, a standard terminal arrival route portion, an approach portion, and an arrival taxiing portion; each of the plurality of flight route portion boxes graphically displaying flight route symbology pertaining to and labeled as each airport taxiing reference point and/or each aeronautical waypoint that falls within its labeled flight route portion; and wherein at least one of the plurality of flight route portion boxes further graphically displays NOTAM symbology pertaining to at least one of the NOTAMs that are relevant to the flight route.

18 Claims, 4 Drawing Sheets

(51) Int. Cl.
    *G06G 7/76*         (2006.01)
    *G08G 5/00*         (2006.01)
    *G08G 5/06*         (2006.01)
    *G01C 23/00*       (2006.01)

(58) Field of Classification Search
    USPC .................................................... 701/3, 120
    See application file for complete search history.

(56)                     References Cited

U.S. PATENT DOCUMENTS

| | | |
|---|---|---|
| 8,723,686 B1 | 5/2014 | Murray et al. |
| 8,996,202 B1 * | 3/2015 | Dorfmann ............ G01C 23/005     701/3 |
| 2002/0039070 A1 | 4/2002 | Ververs et al. |
| 2006/0129286 A1 | 6/2006 | King |
| 2010/0125403 A1 * | 5/2010 | Clark ...................... G01C 21/20     701/120 |
| 2010/0333040 A1 | 12/2010 | Palanisamy et al. |
| 2012/0035849 A1 * | 2/2012 | Clark ...................... G01C 23/00     701/467 |
| 2013/0027226 A1 | 1/2013 | Cabos |
| 2013/0046422 A1 | 2/2013 | Cabos |

OTHER PUBLICATIONS

Kostal, E.; NOTAM Visualization; AeroNavData; 2013.
Lucy; Lucy Flies with Garmin Pilot 5.3 for iOS!; Nov. 4, 2013; Garmin Blog.
Jeppesen; Jeppesen Mobile FliteDeck VFR; AppAnnie; 2013.
EP Extended Search Report for Application No. 16152637.1-1803 dated Jun. 9, 2016.

\* cited by examiner

SYSTEMS AND METHODS FOR DISPLAYING QUICK PREVIEW NOTICES TO AIRMEN

TECHNICAL FIELD

The subject matter described herein relates to the automatic presentation of "quick preview" notices to airmen ("NOTAMs") data on a flight management system for display for flight planning purposes.

BACKGROUND

In flight, a flight crew navigates their aircraft according to a flight plan that is filed with the air traffic control authorities. The flight plan may be manually or electronically loaded into the aircraft's Flight Management System ("FMS") at the beginning of the flight, prior to departure. Among other things, the flight plan typically includes a plurality of geographic waypoints that define a planned track of the aircraft and the specific times at which the aircraft is to arrive at those waypoints. The flight plan also includes information concerning the availability of runways at the flight's point of origin and destination. Typically, a flight plan is updated via an air traffic control (ATC) clearance message from an ATC authority.

In the process of compiling a flight plan, the air crew is obligated to review daily message traffic referred to as notices to airmen ("NOTAMs"). A NOTAM message is a formatted digital message that is filed with an aviation authority to alert aircraft pilots of any hazards located along their flight plan or at a specific location. The authority in turn provides a means of disseminating relevant NOTAMs to pilots. In the United States, NOTAMs are available at the Federal Aviation Administration's National Airspace System Aeronautical Information Management Enterprise System (NAIMES) PilotWeb NOTAM System located on the internet at https://pilotweb.nas.faa.gov/distribution/atcscc.html, as well as via a variety of satellite, wireless, VHF, and other uploading sources available to aircraft.

Traditionally, pilots receive multiple NOTAMs in paper or electronic form that must be deciphered and manually evaluated. Information that is relevant to their specific flight plan is then extracted by the pilot and included in the flight plan. Such, paperwork is time consuming and tedious. Further, NOTAMS that have been issued after the flight plan is created are obviously not available to the pilot during the flight planning phase. Therefore, late breaking NOTAM messages may be missed. Late breaking NOTAM updates may be transmitted to the aircraft, by voice, electronic, paper or other form and considered by the pilot in flight or while preparing for departure or while en route. If a NOTAM update is found to be relevant, a decision must then be made concerning whether to modify the flight plan and how to modify the flight plan.

Such a procedure is inefficient and may result in significant heads down time, during which the pilot's attention may be diverted from preparing the aircraft for departure or from flying the aircraft. Therefore, there is a need to improve the NOTAM review process for flight planning. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

Flight display systems and flight display methods that include a quick preview NOTAM overlay are generally disclosed herein. In one exemplary embodiment, a flight display system includes a flight management system (FMS) that receives and stores a flight route in digital format, wherein the flight route comprises a plurality of connected flight segments defined by airport taxiing reference points and/or aeronautical waypoints, a notice to airmen (NOTAM) receiving unit that automatically receives NOTAM information in digital format comprising a plurality of NOTAMs from a NOTAM-providing source, and a computer processor that is electronically and communicatively coupled with both the FMS and the NOTAM receiving unit, that parses the NOTAM information for ones of the plurality of NOTAMs that are relevant to the flight route. The flight display system further includes a display unit electronically and communicatively coupled with both the FMS and the computer processor that receives and displays from the FMS a graphical moving map that illustrates a current position of the aircraft and that further receives and display from the computer processor a quick preview NOTAM overlay that is overlaid onto a portion of the graphical moving map. The quick preview NOTAM overlay includes a plurality of stacked flight route portion boxes, each of the plurality of flight route portion boxes pertaining to and being labeled as one of: a departure taxiing portion, a standard instrument departure (SID) portion, an en route portion, a standard terminal arrival route (STAR) portion, an approach portion, and an arrival taxiing portion; each of the plurality of flight route portion boxes graphically displaying flight route symbology pertaining to and labeled as each airport taxiing reference point and/or each aeronautical waypoint that falls within its labeled flight route portion; and wherein at least one of the plurality of flight route portion boxes further graphically displays NOTAM symbology pertaining to at least one of the NOTAMs that are relevant to the flight route.

In another exemplary embodiment, a method of providing a flight display includes the steps of, at a flight management system (FMS), receiving and storing a flight route in digital format, wherein the flight route comprises a plurality of connected flight segments defined by airport taxiing reference points and/or aeronautical waypoints, and at a notice to airmen (NOTAM) receiving unit, automatically receiving NOTAM information in digital format comprising a plurality of NOTAMs from a NOTAM-providing source. The method further includes the steps of, at a computer processor that is electronically and communicatively coupled with both the FMS and the NOTAM receiving unit, parsing the NOTAM information for ones of the plurality of NOTAMs that are relevant to the flight route, and at a display unit electronically and communicatively coupled with both the FMS and the computer processor, receiving and displaying from the FMS a graphical moving map that illustrates a current position of the aircraft and further receiving and displaying from the computer processor a quick preview NOTAM overlay that is overlaid onto a portion of the graphical moving map. Displaying the quick preview NOTAM overlay includes displaying a plurality of stacked flight route portion boxes, each of the plurality of flight route portion boxes pertaining to and being labeled as one of: a departure taxiing portion, a standard instrument departure (SID) portion, an en route portion, a standard terminal arrival route (STAR) portion, an approach portion, and an arrival taxiing portion; each of the plurality of flight route portion boxes graphically displaying flight route symbology pertaining to and labeled as each airport taxiing reference point and/or each aeronautical waypoint that falls within its labeled flight route portion; and wherein at least one of the plurality of flight route portion boxes further graphically displays NOTAM symbology pertaining to at least one of the NOTAMs that are relevant to the flight route.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
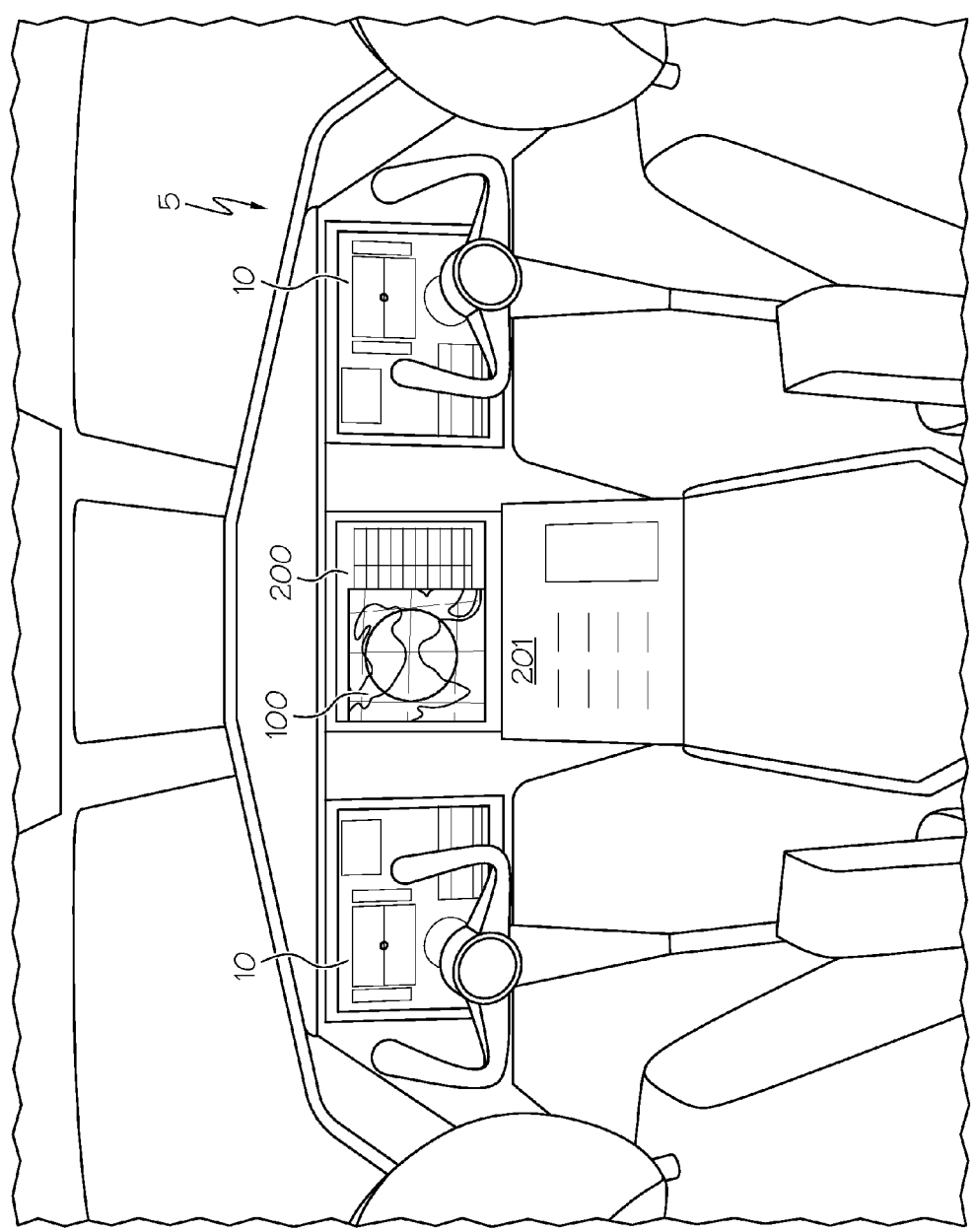
FIG. 1 is a rendition of an aircraft cockpit showing an exemplary location of a flight management system (FMS) in accordance with various embodiments of the present disclosure.

The following disclosure is directed to systems and methods for providing "quick preview" NOTAM messages on a flight display of an aircraft. While digital NOTAMs graphical depiction on a moving map or as chart overlay greatly improves NOTAM processing and briefing there are occasions where workload permits effective use of graphical briefing displays. Such situation occurs when there is some uncertainty in aircraft path or late change of it. Typical example is the last minute announcement or change of approach and runway on arrival which can happen due to vectoring around weather or due to traffic congestion or last minute announcement or change in approach in parallel runway approach. Other example is uncertainty of future assigned path during taxiing segment. In such occasions crew needs efficient means to check and access only NOTAMs that are relevant to flight path and is in danger of missing something important. Today's or future graphical briefing tools allow access to NOTAMs but they are either buried in the heap of other NOTAMs that are irrelevant at moments described above and moreover NOTAMs are not presented in context of major flight path elements.

The present disclosure described below allows for quick access to such NOTAMs that are path relevant and suggest unique graphical human interaction method that presents the NOTAMs in major flight path element context. This innovation proposes a display method to display NOTAMs along the planned aircraft route (either for taxi or in-flight route segments). This display method will decrease pilot's workload by greatly reducing the need for searching panning/scrolling and changing the range on moving map display.

Non-limiting examples of such displays include a plurality of stacked flight route portion boxes, each of the plurality of flight route portion boxes pertaining to and being labeled as one of: a departure taxiing portion, a standard instrument departure portion, an en route portion, a standard terminal arrival route portion, an approach portion, and an arrival taxiing portion; each of the plurality of flight route portion boxes graphically displaying flight route symbology pertaining to each airport taxiing reference point and/or each aeronautical waypoint that falls within its labeled flight route portion; and wherein at least one of the plurality of flight route portion boxes further graphically displays NOTAM symbology pertaining to at least one of the NOTAMs that are relevant to the flight route. The concepts disclosed herein are exemplary and are simplified for purposes of explanation. The embodiments disclosed are not intended to limit the scope of the Applicant's invention in any way.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

The subject matter herein will be disclosed below in the context of an aircraft. However, it will be understood by those of ordinary skill in the art that the subject matter is similarly applicable to other types of vehicles should the need arise. Non-limiting examples of other vehicle types in which the subject matter herein below may be applied includes maritime vessels, spacecraft, watercraft and terrestrial motor vehicles. The subject matter disclosed herein may be incorporated into any suitable navigation or flight data system that currently exists or that may be developed in the future. Without limitation, terrestrial motor vehicles may also include military combat and support vehicles of any description.

As initially noted above in the Brief Summary of the disclosure, embodiments of flight display systems in accordance with the present disclosure include a flight management system (FMS) that receives and stores a flight route in digital format, wherein the flight route comprises a plurality of connected flight segments defined by airport taxiing reference points and/or aeronautical waypoints. FIG. 1 is an exemplary view of a generic aircraft equipped with a Flight Management System (FMS) 5 that may communicate with, or may incorporate within itself, a multi-purpose command display unit (MCDU) 200, which may also include one or more electronic display panels 204. Generally, the FMS 5 may communicate with, or may comprise a primary flight display 10 for each of the pilot and co-pilot, which displays information for controlling the aircraft. The FMS 5 may communicate with, or may also include a navigation display 100, which may also be referred to herein as a "moving map", which may be used in conjunction with the MCDU 200. FMS 5 and MCDU 200 may be in operable communication with data up-link unit 201. In a non-aircraft embodiment, the FMS 5 may instead be a radar console, a radar repeater or a command display.

Figure 2:
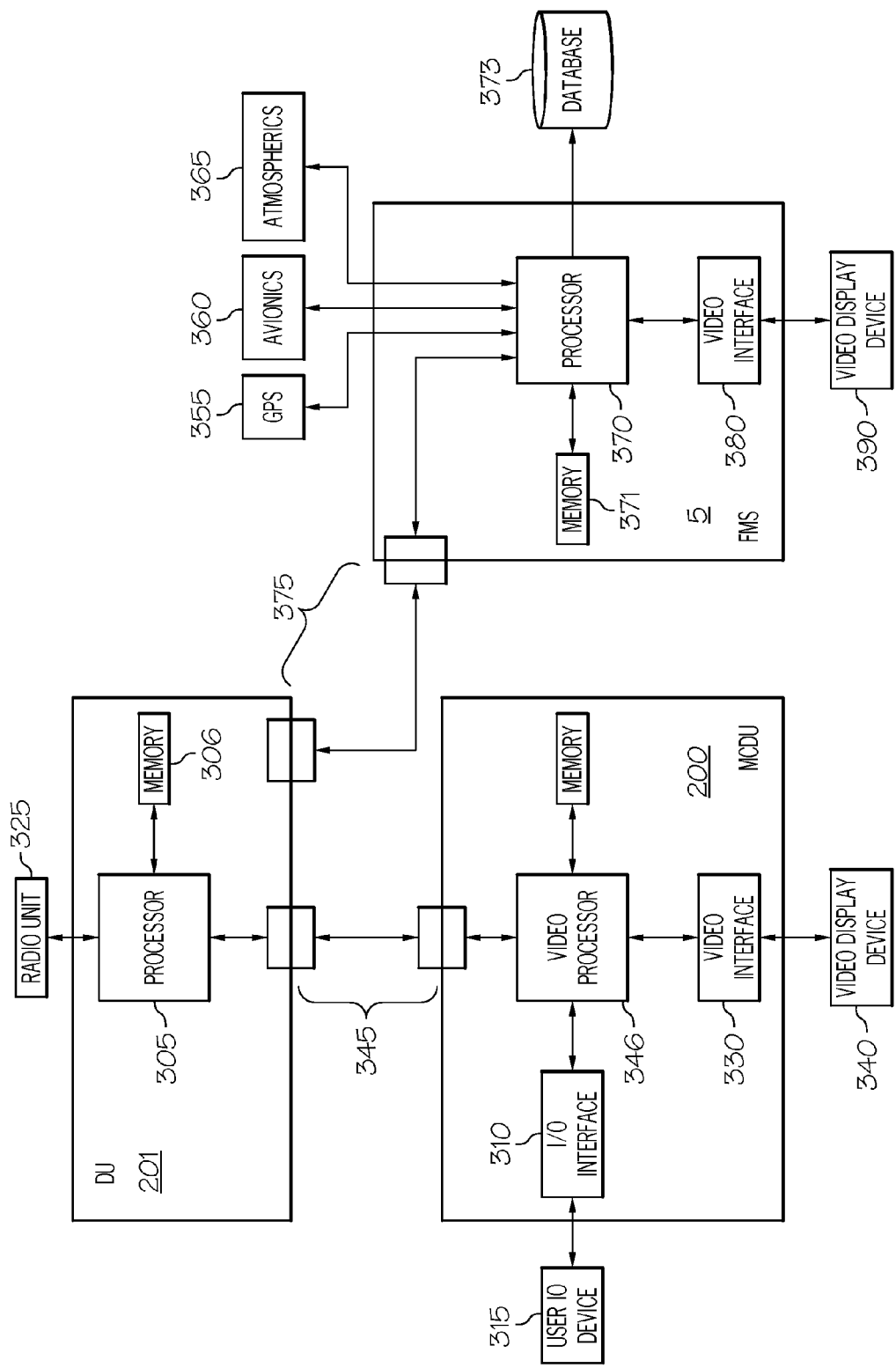
FIG. 2 illustrates a flight display system diagram in accordance with various embodiments of the present disclosure.

FIG. 2 depicts an exemplary system 300 that may be used to implement the subject matter described herein. Although this exemplary embodiment discloses an FMS 5, a data up-link unit 201 and a MCDU 200 as separate units, it would be readily apparent to one of ordinary skill in the art that the functions of the FMS 5, the data up-link unit 201 and the MCDU 200 may be combined into a single computing device, may be broken out into additional devices or may be distributed over a wireless or a wired network.

As further noted above, systems and methods in accordance with the present disclosure may further involve the use of a computer processor that is electronically and communicatively coupled with both the FMS and the NOTAM receiving unit, that parses the NOTAM information for ones of the plurality of NOTAMs that are relevant to the flight route. For example, in some embodiments, FMS 5 comprises the computer processor 370. Processor 370 may be any suitable processor or combination of sub-processors that may be known in the art. Processor 370 may comprise a central processing unit, an embedded processor, a specialized processor (e.g. digital signal processor), or any other electronic element responsible for interpretation and execution of instructions, performance of calculations and/or execution of voice recognition protocols. Processor 370 may communicate with, control and/or work in concert with, other functional components, including but not limited to a video display device 390 via a video interface 380, a geographical positioning system (GPS) 355, a database 373, one or more avionic sensor/processors 360, one or more atmospheric sensor processors 365, and/or one or more data interfaces 375/345. The processor 370 is a non-limiting example of a computer readable medium.

Of course, it should be appreciated that in some instances, NOTAMS may still be received in the conventional manner, i.e., by voice correspondence of the air crew with an appropriate NOTAM issuing or conveying authority, such as air traffic control. In such instances, the embodiments of the present disclosure allow for the aircrew to manually input the NOTAM in to the system 300, for processing by the processor 370. Such manually entered NOTAMs will be handled in the same manner by the system 300 as if such NOTAM had been received by the above-described electronic means.

The processor 370, as noted above, may communicate with database 373. Database 373 may be any suitable type of database known in the art. Non-limiting exemplary types of data bases include flat databases, relational databases, and post-relational databases that may currently exist or be developed in the future. Database 373 may be recorded on any suitable type of non-volatile or volatile memory devices such as optical disk, programmable logic devices, read only memory, random access memory, flash memory and magnetic disks. The database 373 may store flight plan data, aircraft operating data, NOTAM message data, navigation data, hazard data, runway data and other data as may be operationally useful. The database 373 may be an additional, non-limiting example of a computer readable medium.

Processor 370 may include or communicate with a memory module 371. Memory module 371 may comprise any type or combination of Read Only Memory, Random Access Memory, flash memory, programmable logic devices (e.g. a programmable gate array) and/or any other suitable memory device that may currently exist or be developed in the future. The memory module 371 is a non-limiting example of a computer readable medium and may store any suitable type of information. Non-limiting, example of such information include flight plan data, flight plan change data, NOTAM message data and navigation data.

The data I/O interface 375 may be any suitable type of wired or wireless interface as may be known in the art. The data I/O interface 375 receives parsed NOTAM message information from data up-link unit 201 and forwards the parsed data to the processor 370. The I/O interface 375 also receives parameter differential data from the processor 370 and translates the parameter differential data for use by processor 305, and vice versa. Wireless interfaces, if used to implement the data I/O interface may operate using any suitable wireless protocol. Non-limiting, exemplary wireless protocols may include Wi-Fi, Bluetooth™, and Zigbee.

The data up-link unit 201 includes processor 305. Processor 305 may be any suitable processor or combination of sub-processors that may be known in the art. Processor 305 may include a central processing unit, an embedded processor, a specialized processor (e.g. digital signal processor), or any other electronic element responsible for the interpretation and execution of instructions, the performance of calculations and/or the execution of voice recognition protocols. Processor 305 may communicate with, control and/or work in concert with, other functional components including but not limited to a display unit or video display device 340 via a video processor 346 and a video interface 330, a user I/O device 315 via an I/O interface 310, one or more data interfaces 345/375 and/or a radio unit 325. I/O device 315 and video display device 340 may be components within MCDU 200 and also may include transducers 202, 210 and visual display panels 204. It will be appreciated that the data-link unit 201 and the MCDU 200 may be combined into one integrated device. The processor 305 is a non-limiting example of a computer readable medium.

Processor 305 may include or communicate with a memory module 306. Memory module 306 may comprise any type or combination of Read Only Memory, Random Access Memory, flash memory, programmable logic devices (e.g. a programmable gate array) and/or any other suitable memory device that may currently exist or be developed in the future. The memory module 306 is a non-limiting example of a computer readable medium and may contain any suitable configured data. Such exemplary, non-limiting data may include flight plan data, clearance message data, hazard data, NOTAM message data, runway data and flight parameter differential data.

In this regard, the system further includes a notice to airmen (NOTAM) receiving unit that automatically receives NOTAM information in digital format comprising a plurality of NOTAMs from a NOTAM-providing source. For example, and in accordance with an illustrative embodiment, processor 305 may contain instructions that when executed identifies and parses NOTAM messages received over radio unit 325. Processor 305 may then execute instructions that temporarily stores parsed NOTAM message data in memory 306 or communicates the parsed NOTAM message data to processor 370 over interface 375 for processing or for storage in database 373.

The data I/O interface 345 may be any suitable type of wired or wireless interface as may be known in the art. The data I/O interface 345 receives a parsed data clearance message from processor 305 and translates the parsed data clearance data into a format that may be readable by the video processor 346 of MCDU 200 for display in video display device 340. The data I/O interface 345 also receives pilot response information generated by user I/O device 315 via I/O interface 310 for transmission back to the flight control authority via radio unit 325 via processor 305.

Figure 3:
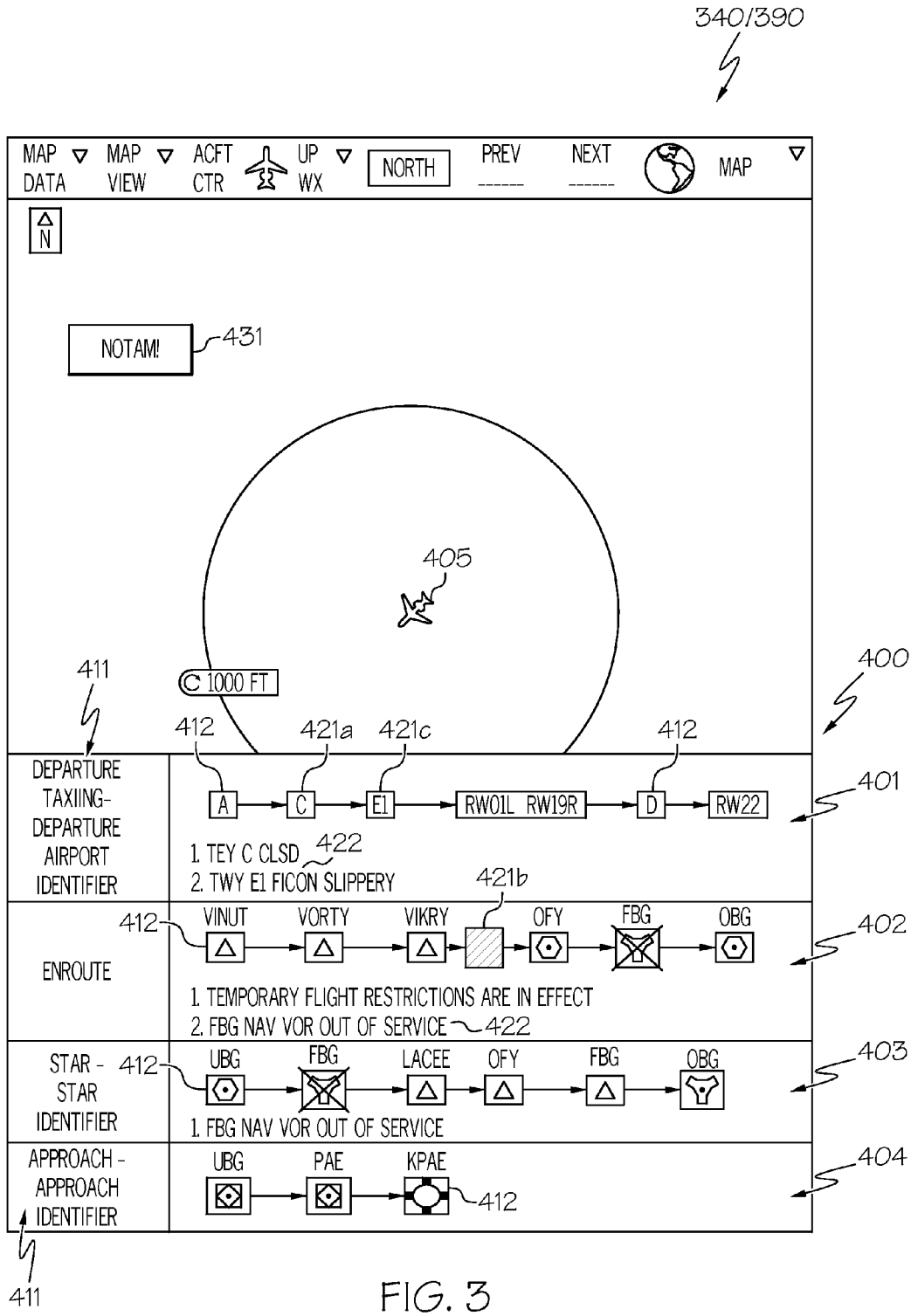
FIG. 3 illustrates an exemplary flight display of a flight display unit of the flight display system shown in FIG. 2 in accordance with various embodiments of the present disclosure.

As further noted above, in some embodiments of the present disclosure, the flight display system further includes a display unit electronically and communicatively coupled with both the FMS and the computer processor that receives and displays from the FMS a graphical moving map that illustrates a current position of the aircraft and that further receives and display from the computer processor a quick preview NOTAM overlay that is overlaid onto a portion of the graphical moving map. FIG. 3 illustrates an exemplary flight display of a flight display unit of the flight display system shown in FIG. 2 in accordance with various embodiments of the present disclosure.

In some embodiments, FIG. 3 illustrates display device/unit 340, whereas in others, it may be display device/unit 390. It should be appreciated that embodiments of the present disclosure may be implemented on any cockpit display of an aircraft, i.e., the display unit comprises one or more of: a primary flight display (PFD), a multi-purpose control display unit (MCDU), and an electronic flight bag (EFB) of the aircraft, for example. Display unit 340/390 includes the graphical moving map that indicates the current position of aircraft 405 with reference to the flight route, such as overflying terrain, at an airport, etc. The "quick preview" NOTAM overlay 400 of the present disclosure overlays a portion of the graphical moving map, for example overlying a lower half of the graphical moving map, or any other suitable portion or location of the graphical moving map on display unit 340/390.

The "quick preview" NOTAM display 400 includes a plurality of stacked flight route portion boxes 401-404. Each of the plurality of flight route portion boxes pertains to and is labeled (411) as one of: a departure taxiing portion (401), a standard instrument departure portion (not illustrated), an en route portion (402), a standard terminal arrival route portion (403), an approach portion (404), and an arrival taxiing portion (not illustrated. Each of the plurality of flight route portion boxes 401-404 graphically display flight route symbology 412 pertaining to and labeled as each airport taxiing reference point and/or each aeronautical waypoint that falls within its labeled flight route portion 401-404. At least one of the plurality of flight route portion boxes 401-404 further graphically displays NOTAM symbology 421a-421c pertaining to at least one of the NOTAMs that are relevant to the flight route. For example, in FIG. 3, each of the flight route portion boxes 401-403 include at least one NOTAM, represented by symbology 421a-421c. Symbology 421a is an "X" overlying taxiway symbol Charlie in box 401, indicating that such taxiway is closed. Each NOTAM symbology may be accompanied with a further graphical display in the form of text 422 that describes the displayed NOTAM symbology (i.e., "TWY C CLSD". If the flight crew desires to see further information regarding the NOTAM, in some embodiments, the NOTAM symbology is selectable to display additional information regarding such NOTAM, the additional information presenting textual information in additional to the text 422 that describes the displayed NOTAM symbology. Symbology 421b is a box between aeronautical waypoints "VIKRY" and "OFY" indicating that flight restrictions are in effect in the region between those waypoints. Symbology 421c is a change in color (from a standard color) of the waypoint or taxiway reference indicating a hazardous condition thereon, which as shown in FIG. 3 is slippery conditions at taxiway Echo 1 in box 401.

In summary, from FIG. 3:
Aircraft's taxi route—Taxiway A, Taxiway C, Taxiway E1, Crosses runway RW01L-RW19R, Taxiway D and Take-off runway RW22.
NOTAMs existing in taxi route are in
a. Taxiway C is closed.
b. Taxiway E1 is slippery.
Aircraft's SID route—WAGGE, JERGA, LLC, EPOSE
NOTAM existing along SID route is on
a. Navaid LLC is closed.
Aircraft's enroute—VINUT, VORTY, VIKRY, OFY, FBG, UBG
NOTAMs existing along enroute are a. There is a TFR airspace in between VIKRY and OFY,
b. Navaid FBG is closed.
Aircraft's STAR route—UBG, FBG, LACEE, ARVAD, FOURT, SEA NOTAM's existing along STAR route are
a. Navaid FBG is closed.
Aircraft's approach route—CVV, PAE, KPAE
There is no NOTAM along approach route.

The five major aspects of the display in FIG. 3 may thus be understood as follows:
1. Flight path segment sections
2. Graphical display of major path elements—standard, pilot well known symbols representing major elements of flight path programmed to be executed
3. Indication of impacted path elements—to allow for quick learning curve only major meaning of NOTAM impact is encoded into graphics
   a. not working at all [e.g. runway is closed] indicating to pilot that he/she shall not proceed on a path
   b. something is somewhat broken [e.g. runway is shortened] indicating to pilot that he/she shall be well aware of the exact details of that NOTAM and then adjust his/her actions accordingly [brake faster, brake before last exit taxiway, not use ILS glide path etc.]
4. Simplified NOTAM text related to impacted elements—full text can be sometimes too long and in addition tool shall work as quick overview of NOTAMs present—full text would broke overview functionality. Full text can be accessed via simplified text by user interface action.
5. Minimized indication—on display where this functionality is available there optionally might by indication of NOTAMs presence allowing invoking of Quick Preview window As further shown in FIG. 3, the flight route symbology 412 is selected from one or more of: a taxiway indicator box, a runway indicator box, a waypoint symbol, a navigational aide symbol, and an airport symbol. Additionally, for each of the plurality of flight route portion boxes 401-404, the flight route symbology 412 is displayed in a horizontal row with arrows connecting each symbol, thereby indicating a progression of taxiing reference points and/or aeronautical waypoints in sequence according to the flight route. As particularly shown in FIG. 3, the quick preview NOTAM overlay 400 comprises at least four flight route portion boxes 401-404, wherein an uppermost of the four boxes 401 is labeled as the departure taxiing portion, wherein a box 402 immediately below the departure taxiing portion box is labeled as the en route portion, wherein a box 403 immediately below the en route portion box is labeled as the STAR portion, and wherein a lowermost of the four boxes 404 is labeled as the approach portion. In some embodiments, as noted above, SID and arrival taxiway boxes may also be included.

The quick preview NOTAM overlay may be display upon an appropriate action by the flight crew. For example, the display unit 340/390 may include, at a location separate and apart from the quick preview NOTAM overlay 400, a NOTAM selection button 431 that is selectable to display or remove the quick preview NOTAM overlay 400 from the graphical moving map upon the selection of such selection button. Other buttons located elsewhere on the flight deck may be provided as a substitute for or in addition to the NOTAM selection button 431.

Figure 4:
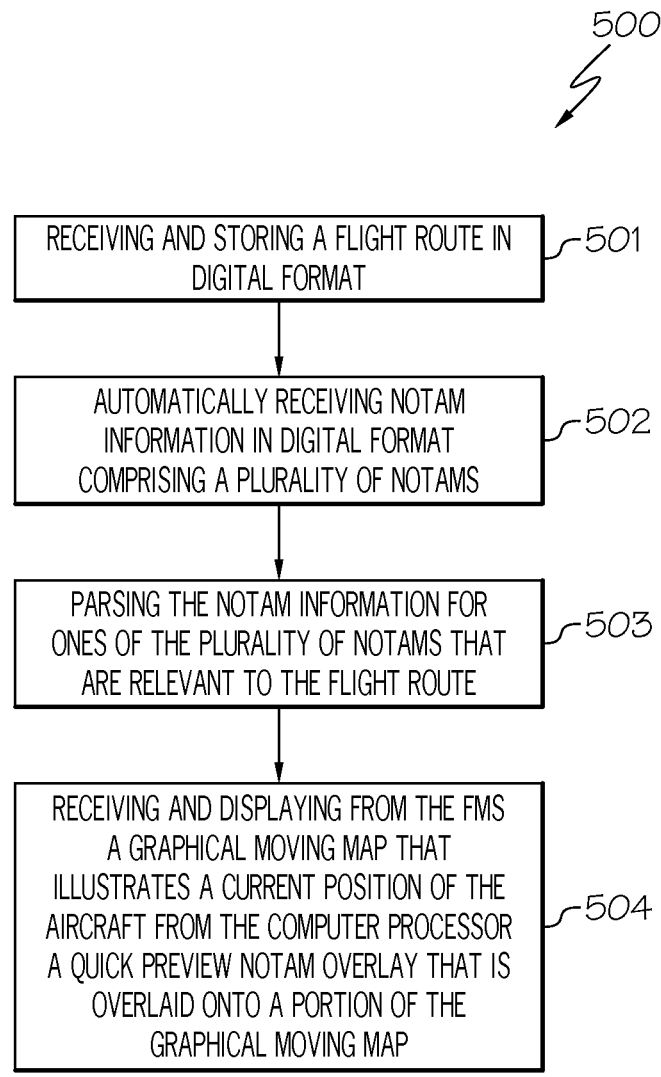
FIG. 4 illustrates an exemplary flow chart of a method for providing a flight display in accordance with various embodiments of the present disclosure.

FIG. 4 is a simplified block-and-flow diagram of a method 500 for providing a flight display on an aircraft that includes the following steps. Step 501: at a flight management system (FMS), receiving and storing a flight route in digital format, wherein the flight route comprises a plurality of connected flight segments defined by airport taxiing reference points and/or aeronautical waypoints. Step 502: at a notice to airmen (NOTAM) receiving unit, automatically receiving NOTAM information in digital format comprising a plurality of NOTAMs from a NOTAM-providing source. Step 503: at a computer processor that is electronically and communicatively coupled with both the FMS and the NOTAM receiving unit, parsing the NOTAM information for ones of the plurality of NOTAMs that are relevant to the flight route. Step 504: at a display unit electronically and communicatively coupled with both the FMS and the computer processor, receiving and displaying from the FMS a graphical moving map that illustrates a current position of the aircraft and further receiving and displaying from the computer processor a quick preview NOTAM overlay that is overlaid onto a portion of the graphical moving map. Displaying the quick preview NOTAM overlay includes displaying a plurality of stacked flight route portion boxes, each of the plurality of flight route portion boxes pertaining to and being labeled as one of: a departure taxiing portion, a standard instrument departure (SID) portion, an en route portion, a standard terminal arrival route (STAR) portion, an approach portion, and an arrival taxiing portion; each of the plurality of flight route portion boxes graphically displaying flight route symbology pertaining to and labeled as each airport taxiing reference point and/or each aeronautical waypoint that falls within its labeled flight route portion; and wherein at least one of the plurality of flight route portion boxes further graphically displays NOTAM symbology pertaining to at least one of the NOTAMs that are relevant to the flight route.

As such, in accordance with the present disclosure, the following technical benefits are achieved. By providing a single preview window containing NOTAM information for each segment of the route of flight that is ahead, the pilot gets an immediate overview of NOTAMs that are near-term applicable to his/her actions. The NOTAM text below path symbol lines are simplifications of full NOTAM text because the NOTAM text is at some occasions (e.g. NOTAM containing a textual note) or for some NOTAM types (e.g. procedural NOTAMs) lengthy and would not fit into simplified list. Each NOTAM text is selectable to bring upon full NOTAM text thus providing all details for any NOTAM shown with a single click, touch, or other interface method. If there is still uncertainty in the path system would recognize such situation and present NOTAMs that are relevant for all path options that are possible. Example of such situation is transition from STAR to runway approach with multiple approaches for given runway direction and STAR exit point. Additionally as the segment/element of path data are entered if there is a NOTAM on the just added segment of route which prevent its use (e.g. Runway/Taxiway is closed) then it is immediately indicated to crew (advisory level alert). NOTAM information could be updated through on-board databases, which could come from satellite, wireless, VHF or other uploading sources, and then compared to the current FMS flight plan to construct the quick preview NOTAM overlay. Thus, by providing an updatable, end-to-end, single window preview of all current NOTAMs applicable to a specific route of flight, flight crew situational awareness is improved, pilot workload can be greatly reduced, and safety of flight margins increased. A future implementation is now realized wherein digital NOTAMs ground systems are getting into operational stages as well as due to advancements in datalink standardization that would allow near-real time update of NOTAM data.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A flight display system on an aircraft comprising:
   a flight management system (FMS) that receives and stores a flight route in digital format, wherein the flight route comprises a plurality of connected flight segments defined by airport taxiing reference points and aeronautical waypoints;
   a notice to airmen (NOTAM) receiving unit that automatically receives NOTAM information in digital format comprising a plurality of NOTAMs from a NOTAM-providing source, wherein at least one NOTAM of the plurality of NOTAMs pertains to a departure taxiing portion of the flight route and wherein at least one NOTAM of the plurality of NOTAMs pertains to an en route portion of the flight route;
   a computer processor that is electronically and communicatively coupled with both the FMS and the NOTAM receiving unit, that parses the NOTAM information for ones of the plurality of NOTAMs that are relevant to the flight route; and
   a display unit electronically and communicatively coupled with both the FMS and the computer processor that receives and displays from the FMS a graphical moving map that illustrates a current position of the aircraft and that further receives and displays from the computer processor a quick preview NOTAM overlay that is overlaid onto a portion of the graphical moving map, wherein the quick preview NOTAM overlay comprises:
     at least two stacked flight route portion boxes, one of the at least two stacked flight route portion boxes pertaining to and being labeled as a departure taxiing portion and another of the at least two stacked flight route portion boxes pertaining to and being labeled as an en route portion, and optionally additional flight route portion boxes stacked with the at least two stacked flight route portion boxes, wherein if additional flight route portion boxes are present they pertain to and are labeled as one of: a standard instrument departure (SID), a standard terminal arrival route (STAR) portion, an approach portion, and an arrival taxiing portion; the at least two stacked flight route portion boxes graphically displaying flight route symbology pertaining to and labeled as each airport taxiing reference point of the flight route for the departure taxiing portion and each aeronautical waypoint of the flight route for the en route portion; wherein the at least two stacked flight route portion boxes further graphically display NOTAM symbology pertaining to the at least one NOTAM pertaining to the departure taxiing portion and the at least one NOTAM pertaining to the en route portion; wherein both of the at least two stacked flight route portion boxes excludes full text of the one or more of the plurality of NOTAMs that are relevant to the flight route; and wherein both of the at least two stacked flight route portion boxes are displayed simultaneously such that the quick preview NOTAM overlay simultaneously shows the flight route symbology and the NOTAM symbology for each of the departure taxiing portion and the en route portion.

2. The flight display system of claim 1, wherein the flight route symbology is selected from one or more of: a taxiway indicator box, a runway indicator box, a waypoint symbol, a navigational aide symbol, and an airport symbol.

3. The flight display system of claim 1, wherein, for each of the at least two stacked flight route portion boxes, the flight route symbology is displayed in a horizontal row with arrows connecting each symbol, thereby indicating a progression of taxiing reference points and aeronautical waypoints in sequence according to the flight route.

4. The flight display system of claim 1, wherein the at least two stacked flight route portion boxes further graphically display simplified NOTAM text that describes the displayed NOTAM symbology but that excludes full text of the NOTAM.

5. The flight display system of claim 4, wherein the NOTAM symbology is selectable to display additional information regarding such NOTAM, the additional information presenting textual information in additional to the simplified NOTAM text that describes the displayed NOTAM symbology.

6. The flight display system of claim 1, wherein the quick preview NOTAM overlay comprises at least four flight route portion boxes, wherein an uppermost of the four boxes is labeled as the departure taxiing portion, wherein a box immediately below the departure taxiing portion box is labeled as the en route portion, wherein a box immediately below the en route portion box is labeled as the STAR portion, and wherein a lowermost of the four boxes is labeled as the approach portion.

7. The flight display system of claim 1, wherein the NOTAM symbology is selected from one or more of: an "X" symbol overlying one of the airport taxiing reference points and/or aeronautical waypoints indicating that such reference point and/or waypoint is closed and/or out of service, a change in color from a standard color of the airport taxiing reference points and/or aeronautical waypoints indicating that such reference point and/or waypoint has a hazardous condition present, and a further box inserted between two or more of the aeronautical waypoints indicating a flight restriction between said two or more of the aeronautical waypoints.

8. The flight display system of claim 1, wherein, at a location separate and apart from the quick preview NOTAM overlay, the graphical moving map comprises a NOTAM selection button that is selectable to display or remove the quick preview NOTAM overlay from the graphical moving map upon the selection of such selection button.

9. The flight display system of claim 1, wherein the display unit comprises one or more of: a primary flight display (PFD), a multi-purpose control display unit (MCDU), and an electronic flight bag (EFB) of the aircraft.

10. A method of providing a flight display on an aircraft comprising the steps of:
at a flight management system (FMS), receiving and storing a flight route in digital format, wherein the flight route comprises a plurality of connected flight segments defined by airport taxiing reference points and aeronautical waypoints;
at a notice to airmen (NOTAM) receiving unit, automatically receiving NOTAM information in digital format comprising a plurality of NOTAMs from a NOTAM-providing source, wherein at least one NOTAM of the plurality of NOTAMs pertains to a departure taxiing portion of the flight route and wherein at least one NOTAM of the plurality of NOTAMs pertains to an en route portion of the flight route;
at a computer processor that is electronically and communicatively coupled with both the FMS and the NOTAM receiving unit, parsing the NOTAM information for ones of the plurality of NOTAMs that are relevant to the flight route; and
at a display unit electronically and communicatively coupled with both the FMS and the computer processor, receiving and displaying from the FMS a graphical moving map that illustrates a current position of the aircraft and further receiving and displaying from the computer processor a quick preview NOTAM overlay that is overlaid onto a portion of the graphical moving map, wherein displaying the quick preview NOTAM overlay comprises displaying:
at least two stacked flight route portion boxes, one of the at least two stacked flight route portion boxes pertaining to and being labeled as a departure taxiing portion and another of the at least two stacked flight route portion boxes pertaining to and being labeled as an en route portion, and optionally additional flight route portion boxes stacked with the at least two stacked flight route portion boxes, wherein if additional flight route portion boxes are present they pertain to and are labeled as one of: a standard instrument departure (SID), a standard terminal arrival route (STAR) portion, an approach portion, and an arrival taxiing portion; the at least two stacked flight route portion boxes graphically displaying flight route symbology pertaining to and labeled as each airport taxiing reference point of the flight route for the departure taxiing portion and each aeronautical waypoint of the flight route for the en route portion; wherein the at least two stacked flight route portion boxes further graphically display NOTAM symbology pertaining to the at least one NOTAM pertaining to the departure taxiing portion and the at least one NOTAM pertaining to the en route portion; wherein both of the at least two stacked flight route portion boxes excludes full text of the one or more of the plurality of NOTAMs that are relevant to the flight route; and wherein both of the at least two stacked flight route portion boxes are displayed simultaneously such that the quick preview NOTAM overlay simultaneously shows the flight route symbology and the NOTAM symbology for each of the departure taxiing portion and the en route portion.

11. The method of claim 10, wherein the flight route symbology is selected from one or more of: a taxiway indicator box, a runway indicator box, a waypoint symbol, a navigational aide symbol, and an airport symbol.

12. The method of claim 10, wherein, for each of the at least two stacked flight route portion boxes, the flight route symbology is displayed in a horizontal row with arrows connecting each symbol, thereby indicating a progression of taxiing reference points and aeronautical waypoints in sequence according to the flight route.

13. The method of claim 10, wherein the at least two stacked flight route portion boxes further graphically display simplified NOTAM text that describes the displayed NOTAM symbology but that excludes full text of the NOTAM.

14. The method of claim 13, wherein the NOTAM symbology is selectable to display additional information regarding such NOTAM, the additional information presenting textual information in additional to the simplified NOTAM text that describes the displayed NOTAM symbology.

15. The method of claim 10, wherein the quick preview NOTAM overlay comprises at least four flight route portion boxes, wherein an uppermost of the four boxes is labeled as the departure taxiing portion, wherein a box immediately below the departure taxiing portion box is labeled as the en route portion, wherein a box immediately below the en route portion box is labeled as the STAR portion, and wherein a lowermost of the four boxes is labeled as the approach portion.

16. The method of claim 10, wherein the NOTAM symbology is selected from one or more of: an "X" symbol overlying one of the airport taxiing reference points and/or aeronautical waypoints indicating that such reference point and/or waypoint is closed and/or out of service, a change in color from a standard color of the airport taxiing reference points and/or aeronautical waypoints indicating that such reference point and/or waypoint has a hazardous condition present, and a further box inserted between two or more of the aeronautical waypoints indicating a flight restriction between said two or more of the aeronautical waypoints.

17. The method of claim 10, wherein, at a location separate and apart from the quick preview NOTAM overlay, the graphical moving map comprises a NOTAM selection button that is selectable to display or remove the quick preview NOTAM overlay from the graphical moving map upon the selection of such selection button.

18. The method of claim 10, wherein the display unit comprises one or more of: a primary flight display (PFD), a multi-purpose control display unit (MCDU), and an electronic flight bag (EFB) of the aircraft.

\* \* \* \* \*